(12) United States Patent
Mori et al.

(10) Patent No.: US 11,113,292 B2
(45) Date of Patent: Sep. 7, 2021

(54) FEATURE DATA STORAGE APPARATUS AND DRIVING FEATURE AND DISTRIBUTION DATABASES

(71) Applicant: DENSO CORPORATION, Kariya (JP)

(72) Inventors: Masataka Mori, Kariya (JP); Kentaro Hitomi, Kariya (JP); Kazuhito Takenaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 136 days.

(21) Appl. No.: 16/227,563

(22) Filed: Dec. 20, 2018

(65) Prior Publication Data

US 2019/0197038 A1 Jun. 27, 2019

(30) Foreign Application Priority Data

Dec. 22, 2017 (JP) .............................. JP2017-246827

(51) Int. Cl.
*G06F 16/24* (2019.01)
*G06F 16/2458* (2019.01)
*G06K 9/62* (2006.01)
*G06F 16/28* (2019.01)
*G06N 7/00* (2006.01)
(Continued)

(52) U.S. Cl.
CPC .......... *G06F 16/2462* (2019.01); *G06F 16/28* (2019.01); *G06K 9/00791* (2013.01); *G06K 9/629* (2013.01); *G06K 9/6215* (2013.01); *G06N 7/005* (2013.01); *G01C 21/00* (2013.01); *G06K 9/00805* (2013.01)

(58) Field of Classification Search
CPC ................................................... G06F 16/2462
See application file for complete search history.

(56) References Cited

U.S. PATENT DOCUMENTS

| 2008/0183731 A1* | 7/2008 | Gilbert ................ G06F 16/2457 |
| 2009/0005929 A1* | 1/2009 | Nakao ...................... B62D 1/02 |
| | | 701/33.4 |

(Continued)

FOREIGN PATENT DOCUMENTS

| JP | 5278419 B2 | 9/2013 |
| JP | 6026959 B2 | 12/2014 |

(Continued)

*Primary Examiner* — Pierre M Vital
*Assistant Examiner* — Andrew N Ho
(74) *Attorney, Agent, or Firm* — Maschoff Brennan

(57) ABSTRACT

A computer calculates, in accordance with a maximum mean discrepancy, a similarity level between a first feature distribution correlating to a first distribution information item stored in a distribution database and a second feature distribution correlating to a second distribution information item stored in the distribution database. The second distribution information item is different from the first distribution information item. The maximum mean discrepancy is a distance measure indicative of the similarity level between the first and second feature distributions. The computer determines whether the calculated similarity level is equal to or higher than a predetermined threshold, and integrates the first feature distribution and the second feature distribution into a common feature distribution upon determining that the calculated similarity level is equal to or higher than the predetermined threshold.

5 Claims, 5 Drawing Sheets

(51) Int. Cl.
*G06K 9/00* (2006.01)
*G01C 21/00* (2006.01)

(56) References Cited

U.S. PATENT DOCUMENTS

| | | | |
|---|---|---|---|
| 2009/0292413 A1* | 11/2009 | Kubotani | B60R 16/0231 |
| | | | 701/96 |
| 2011/0246027 A1* | 10/2011 | Miyajima | G01C 21/3647 |
| | | | 701/41 |
| 2012/0154175 A1 | 6/2012 | Bandou et al. | |
| 2017/0154082 A1* | 6/2017 | Michel | G06F 16/22 |
| 2017/0337812 A1 | 11/2017 | Mori et al. | |

FOREIGN PATENT DOCUMENTS

| | | |
|---|---|---|
| JP | 2017-041020 A | 2/2017 |
| JP | 2017-204260 A | 11/2017 |

\* cited by examiner

FIG.2

| ATTRIBUTE TYPE | DISCRETE VALUE | INPUT VALUE | RANGE |
|---|---|---|---|
| TIME | 0 | POINT OF TIME | 0:00:00～0:59:59 |
| TIME | 1 | POINT OF TIME | 1:00:00～1:59:59 |

FIG.3

| FEATURE ID | ATTRIBUTE DATA | FEATURE DATA |
|---|---|---|
| 1 | (0, 0, 0) | (0.5, −3, 2.7, 0.5) |

FIG.4A

| DISTRIBUTION ID | ATTRIBUTE DATA |
|---|---|
| 1 | (0, 0, 0) |
| 2 | (0, 0, 1) |
| 3 | (0, 0, 2) |

FIG.4B

| DISTRIBUTION ID | ATTRIBUTE DATA |
|---|---|
| 1 | (0, 0, 0) |
| 1 | (0, 0, 1) |
| 3 | (0, 0, 2) |

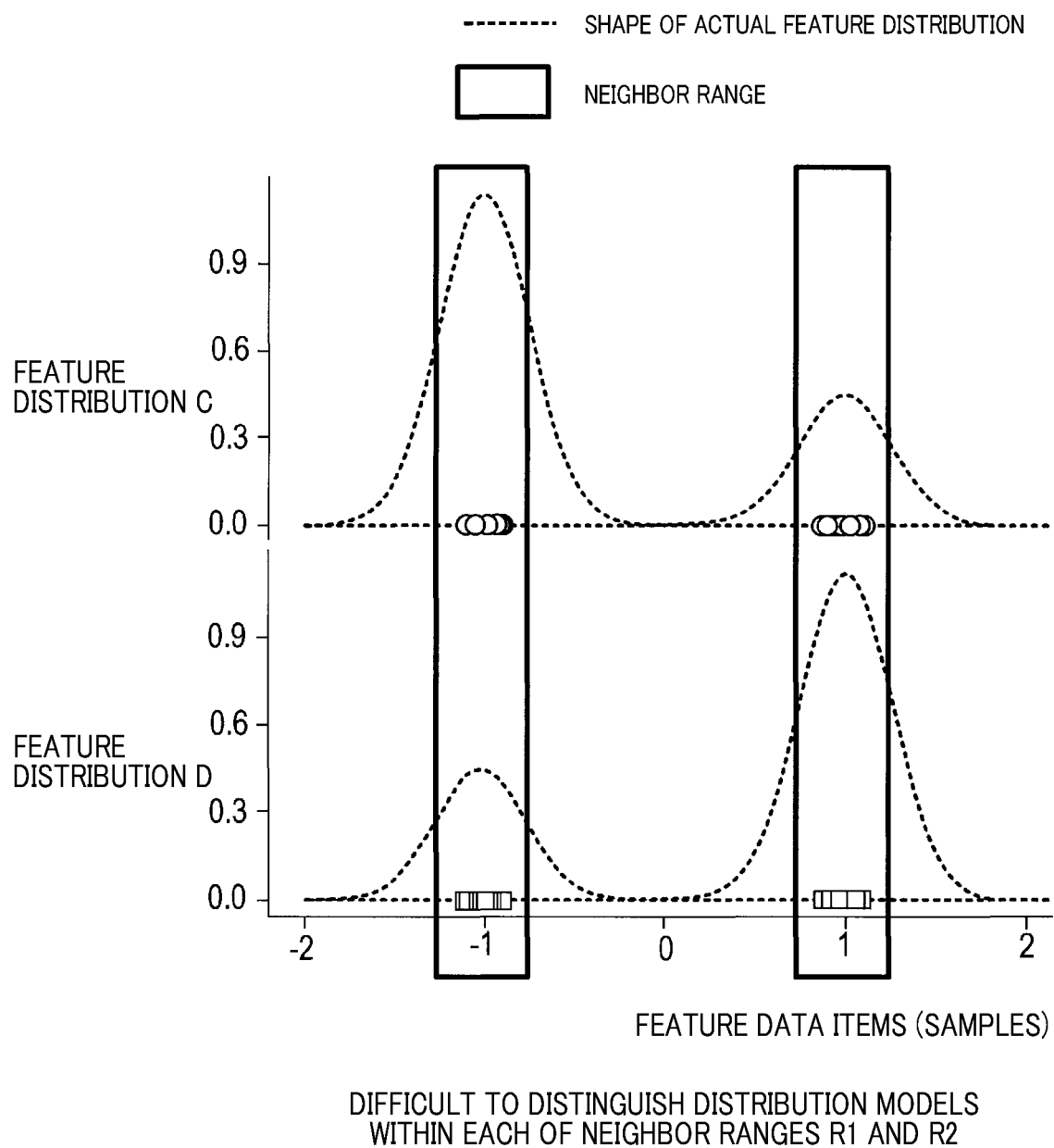

FEATURE DATA STORAGE APPARATUS AND DRIVING FEATURE AND DISTRIBUTION DATABASES

CROSS REFERENCE TO RELATED APPLICATION

This application is based on and claims the benefit of priority from Japanese Patent Application No. 2017-246827 filed on Dec. 22, 2017, the disclosure of which is incorporated in its entirety herein by reference.

TECHNICAL FIELD

The present disclosure relates to feature data storage apparatuses that store distributions of driving feature data items collected from plural vehicles.

BACKGROUND

Cruise-assist systems for assisting cruising, i.e. driving, of a target vehicle have been recently proposed.

Such a cruise-assist system collects, from each of plural vehicles, driving feature data items, and includes a storage apparatus that stores distributions of the collected driving feature data items. Then, the cruise-assist system is configured to assist, when a target vehicle to be assisted is travelling, the driver's driving of the target vehicle in accordance with the stored distributions of the collected driving feature data items.

For example, a travelling section evaluation method, which is one type of such cruise-assist systems, is disclosed in Japanese Patent Application Publication No. 2017-41020.

The published travelling section evaluation method collects, from each of plural vehicles including an own vehicle, driving feature data items including following distances, i.e. inter vehicular distances.

The published travelling section evaluation method stores a first distribution of the following distances of the own vehicle for an own-vehicle driver, and also stores a second distribution of the following distances of each of the other vehicles for the corresponding one of the other drivers.

Then, the published travelling section evaluation method compares the first distribution with the second distributions, and extracts, from the second distributions, at least one second distribution; the at least one extracted second distribution is similar to the first distribution.

The published travelling section evaluation method determines, based on the at least one extracted second distribution, whether the driver of the own vehicle will be forced to adjust the following distance if the own vehicle travels a travelling route candidate for the own vehicle. The published travelling method provides the driver of the own vehicle an alternative route upon determining that the driver of the own vehicle will be forced to adjust the following distance if the own vehicle travels the travelling route candidate for the own vehicle.

SUMMARY

Such a cruise-assist system preferably includes a high-performance storage apparatus that stores distributions of the collected driving feature data items such that (1) Some distributions, whose shapes are different from each other, are distinguished from each other (2) Some distributions, whose shapes are similar to each other, have been integrated into an integrated distribution This configuration of the storage apparatus results in reduction of the stored amount of the distributions.

For achieving such a high-performance storage apparatus, it is necessary to evaluate similarity between distributions of the collected driving feature data items with higher accuracy.

From this viewpoint, the published travelling section evaluation method specially expresses the first distribution as a first histogram, which is an example of a simple statistical model, and also expresses the second distributions as respective second histograms, and evaluates similarity between the first histogram and each of the second histograms.

Unfortunately, a distribution of collected driving feature data items may have a complicated configuration, so that it may be difficult to obtain, with high accuracy, similarity between the first distribution of collected driving feature data items and each second distribution of collected driving feature data items if each of the first and second distributions is expressed as a simple statistical model, such as a histogram.

There is a method of calculating similarity between the first distribution of collected driving feature data items and each second distribution of collected driving feature data items in accordance with the distances between a predetermined number of extracted data items, i.e. data samples, in the first distribution and a corresponding number of extracted data items, i.e. data samples, in the second distribution; the extracted data items from the first distribution are nearest to the respective extracted data items from the second distribution.

Unfortunately, this method focuses on only the distances between the predetermined number of extracted data items in the first distribution and the corresponding number of extracted data items in the second distribution without focusing on the difference between the density of the first distribution of the collected data samples and the density of the second distribution of the collected data samples. It may be therefore difficult to obtain, with high accuracy, similarity between the first distribution of collected driving feature data items and each second distribution of collected driving feature data items.

In view of the circumstances set forth above, a first aspect of the present disclosure seeks to provide driving feature data storage apparatuses, each of which is capable of evaluating, with higher accuracy, similarity between distributions, each of which is based on collected driving feature data items, thus enabling the distributions to be stored with higher efficiency.

A feature data storage apparatus for storing feature data distributions based on driving information items collected from a plurality of vehicles according to a first exemplary aspect of the present disclosure includes a feature database configured to store feature data items and attribute data items such that each of the feature data items correlates to at least one of the attribute data items. Each of the attribute data items represents an attribute of at least one of the feature data items.

The feature data storage apparatus includes a distribution database configured to store distribution information items respectively representing feature distributions. Each of the feature distributions includes a set of feature data items that correlates to a common one of the attribute data items. Each of the distribution information items is stored to correlate to the common one of the attribute data items.

The feature data storage apparatus includes a computer configured to calculate, in accordance with a maximum mean discrepancy, a similarity level between a first feature distribution correlating to a first distribution information item stored in the distribution database and a second feature distribution correlating to a second distribution information item stored in the distribution database. The maximum mean discrepancy is a measure indicative of the similarity level between the first and second feature distributions, the second distribution information item being different from the first distribution information item.

The computer is configured to determine whether the calculated similarity level is equal to or higher than a predetermined threshold, and integrate the first feature distribution and the second feature distribution into a common feature distribution upon determining that the calculated similarity level is equal to or higher than the predetermined threshold.

Similarly, a method of storing feature data distributions based on driving information items collected from a plurality of vehicles according to a send exemplary aspect of the present disclosure includes (1) Storing, in a feature database, feature data items and attribute data items such that each of the feature data items correlates to at least one of the attribute data items, each of the attribute data items representing an attribute of at least one of the feature data items; and (2) Storing, in a distribution database, distribution information items respectively representing feature distributions, each of the feature distributions including a set of feature data items that correlates to a common one of the attribute data items, each of the distribution information items being stored to correlate to the common one of the attribute data items (3) Calculating, in accordance with a maximum mean discrepancy, a similarity level between a first feature distribution correlating to a first distribution information item stored in the distribution database, and a second feature distribution correlating to a second distribution information item stored in the distribution database The second distribution information item is different from the first distribution information item, and the maximum mean discrepancy is a measure indicative of the similarity level between the first and second feature distributions.

The method is also configured to (1) Determining whether the calculated similarity level is equal to or higher than a predetermined threshold (2) Integrating the first feature distribution and the second feature distribution into a common feature distribution upon determining that the calculated similarity level is equal to or higher than the predetermined threshold Each of the first and second exemplary aspects is configured to calculate, in accordance with a maximum mean discrepancy (MMD), a similarity level between a first feature distribution correlating to a first distribution information item stored in the distribution database and a second feature distribution correlating to a second distribution information item stored in the distribution database; the second distribution information item is different from the first distribution information item.

Using the MMD enables the similarity level between the first and second distributions to be calculated with higher accuracy while regarding the shape and density of each of the different first and second feature distributions, thus integrating the different first and second feature distributions into a common integrated feature distribution. This therefore enables the computer to store feature distributions with higher accuracy.

BRIEF DESCRIPTION OF THE DRAWINGS

Other aspects of the present disclosure will become apparent from the following description of embodiments with reference to the accompanying drawings in which:

FIG. 2 is a table schematically illustrating an example of a relationship between an attribute type and discrete values of a corresponding attribute data item;

FIG. 3 is a table schematically illustrating an example of a relationship between a feature data set comprised of a feature data item and an attribute data item to which a feature ID is assigned;

FIG. 4A is a table schematically illustrating a correlation between different distribution IDs and corresponding attribute data items stored in an integration DB;

FIG. 4B is a table schematically illustrating a correlation between common distribution IDs and corresponding attribute data items stored in the integration DB;

FIG. 7 is a graph schematically illustrating an example where, if the similarity level between feature distributions is designed to be calculated based on distances between feature data items of one of the feature distributions and corresponding feature data items of the other, the similarity level between the feature distributions may be calculated as a relatively high value although the similarity level between the shapes of actual feature distributions corresponding to the respective feature distributions is a relatively low value.

DETAILED DESCRIPTION OF EMBODIMENT

The following describes an exemplary embodiment of the present disclosure with reference to the accompanying drawings. In the exemplary embodiment and its modifications, like parts between the exemplary embodiment and its modifications are omitted or simplified to avoid redundant description.

Structure

Figure 1:
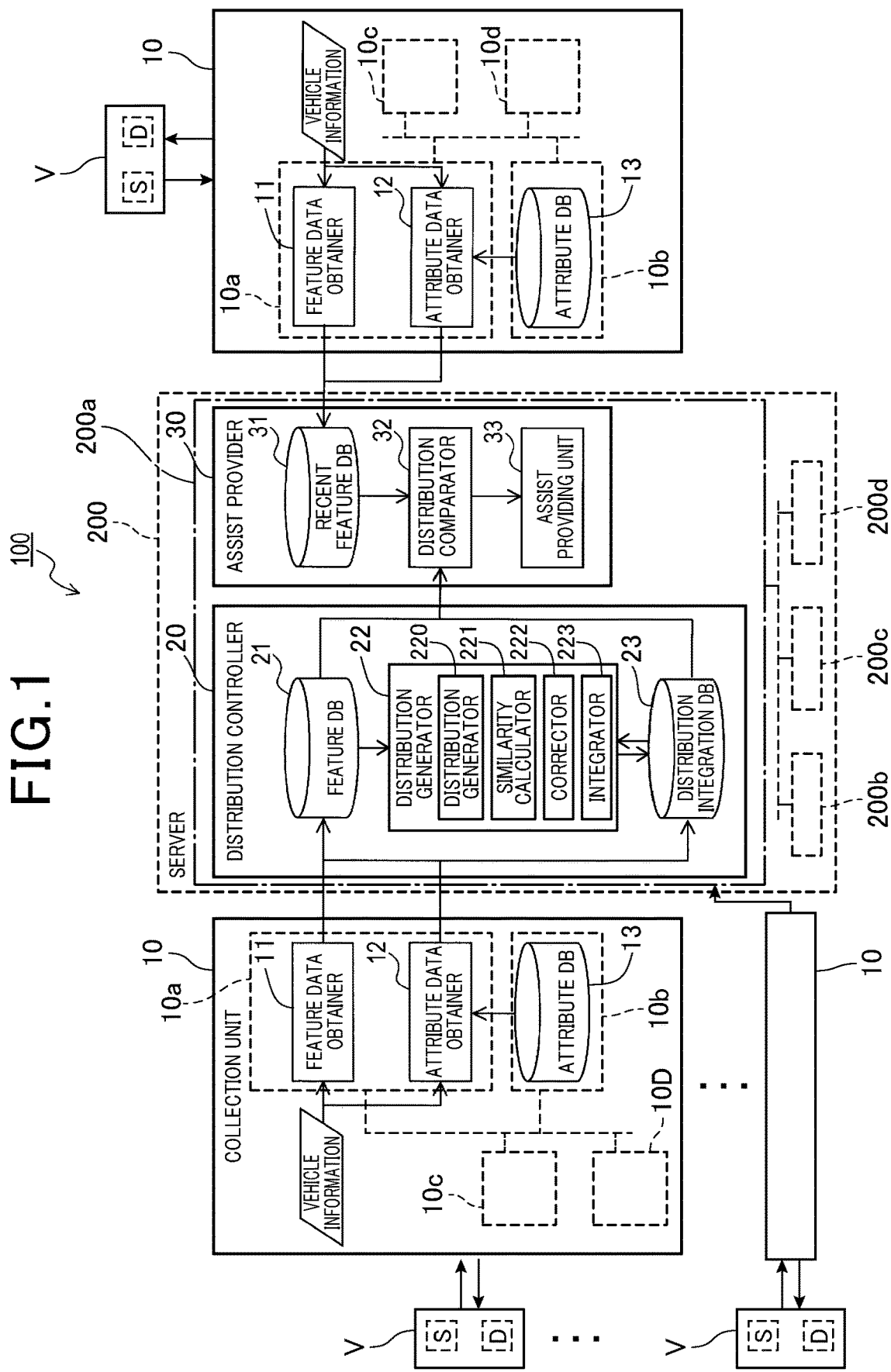
FIG. 1 is a block diagram schematically illustrating an example of a cruise-assist system according to an exemplary embodiment of the present disclosure.

FIG. 1 is a block diagram illustrating a schematic structure of a cruise-assist system 100 according to the exemplary embodiment of the present disclosure.

The cruise-assist system 100 includes a plurality of collection units 10, and a server 200 serves as, for example, a feature data storage apparatus.

Each of the collection units 10 is configured as an in-vehicle device. The in-vehicle device is mainly comprised of a computer including a processor, i.e. CPU, 10a, a memory 10b comprised of, for example, a RAM and a ROM, an I/O interface 10c, and a radio communicator 10d; the ROM is an example of a non-transitory storage medium. The collection units 10 are respectively installed in vehicles, i.e. sample vehicles, V.

Each of the collection units 10 is configured to wirelessly communicate with the server 200.

The CPU 10a runs one or more programs stored in, for example, the ROM of the memory 10b, thus implementing the functions of respective feature data obtainers 11 and attribute data obtainer 12. In other words, the CPU 10a functionally includes the feature data obtainer 11 and attribute data obtainer 12. At least part or the whole of each of the functional modules 11 and 12 can be implemented as a hardware circuit or a hardware/software hybrid circuit.

Each of the collection units 10 also includes an attribute database (DB) 13 stored in, for example, the memory 10b or stored in an external storage medium.

Each feature data obtainer 11 installed in the corresponding vehicle V includes various sensors S installed in the corresponding vehicle V. Each feature data obtainer 11 repeatedly collects driving information items, i.e. driving data items, from vehicle information items repeatedly sent from the sensors S. That is, the vehicle information items include the driving information items and attribute-related information items.

The driving information items include driving operation information items about driver's operations of the corresponding vehicle V, and vehicle behavior information items monitored by the sensors installed to the corresponding vehicle V.

The driving operation information items include, for example, (1) The operated quantity of an accelerator pedal of the corresponding vehicle V operated by a driver of the corresponding vehicle V, i.e. the operated quantity of a throttle valve of the corresponding vehicle V linked to the accelerator pedal (2) The operated quantity of a brake pedal of the corresponding vehicle V operated by a driver of the corresponding vehicle V (3) The steering angle of the corresponding vehicle V operated by the driver of the corresponding vehicle V The vehicle behavior information items include, for example, the speed, i.e. vehicle speed, of the corresponding vehicle V, the acceleration of the corresponding vehicle V, and the yaw rate of the corresponding vehicle V.

Each feature data obtainer 11 is configured to calculate or obtain, based on the driving data items, features, i.e. feature data items.

Each feature data item is at least one of the driving information items themselves and/or processed data items, such as differential data items, obtained based on predetermined processing of these vehicle driving information items.

For example, each feature data item obtained by each feature data obtainer 11 includes the speed of the corresponding vehicle V, the acceleration of the corresponding vehicle V, the operated quantity of the acceleration pedal of the corresponding vehicle V, the operated quantity of the brake pedal of the corresponding vehicle V, the steering angle of the corresponding vehicle V, the operated rate of the accelerator pedal of the corresponding vehicle V, the operated rate of the brake pedal, and/or the operated rate of the steering of the corresponding vehicle V.

Each feature data obtainer 11 can be configured to convert the driving data items and/or their differential data items for a feature data item into discrete symbols as the feature data item using a known method disclosed in, for example, Japanese Patent Publication No. 5278419. Specifically, each feature data obtainer 11 can use, as the discrete symbols, driving topic proportions, which are disclosed in Japanese Patent Publication No. 6026959. The disclosure of Japanese Patent Publications No. 5278419 and 6026959 are incorporated entirely herein by reference.

Specifically, each feature data item according to the exemplary embodiment is comprised of plural discrete values respectively corresponding to plural driving information items or their processed data items as discrete elements of the corresponding feature data vector.

Each attribute data obtainer 12 installed in the corresponding vehicle V includes various in-vehicle devices, such as sensors and communication devices, D. Each attribute data obtainer 12 repeatedly collects, from the vehicle information items, the attribute-related information items, and converts the attribute-related information items into attribute vectors serving respectively as attribute data items.

The attribute-related information items are each indicative of an attribute to which at least one of the driving information items correlate, i.e. belong. In other words, the attribute-related information items include information items each indicative of an attribute of a travelling situation where at least one of the driving information items is collected.

That is, the attribute-related information items include, for example, time data items, position data items, weather data items, vehicle type data items, and driver identifiers (IDs).

The time data items include, for example, the collection time and day of week for each of the driving information items. The position data items include, for example, the latitude and longitude of the current position of the corresponding vehicle V for each of the driving information items; the latitude and longitude of the current position of the corresponding vehicle V are obtained based on global positioning system (GPS) signals, which are sent from GPS satellites, received by a GPS receiver installed in the corresponding vehicle V as one of the in-vehicle devices D.

The weather information items include, for example, the current weather condition, such as a fine weather (fine weather condition) or rain (rain condition), around the corresponding vehicle V for each of the driving information items, which is sent from a weather center and received by a communication device as one of the in-vehicle devices D. The weather information items also include, for example, the amount of rainfall at the present time measured by a sensor as one of the in-vehicle devices D, and the amount of insolation at the present time measured by a sensor as one of the in-vehicle devices D. The vehicle type information items include, for example, the type and a predetermined displacement volume of the corresponding vehicle V.

Note that each attribute-related information corrector 12 does not necessarily collect all the above attribute-related information items, and can collect at least part of the above attribute-related information items.

Each attribute data collector 12 is configured to convert each of the attribute-related information items correlating to at least one of the driving information items into a discrete value constituting an element of an attribute vector in accordance with one of predetermined discretization rules stored in the attribute DB 13.

Specifically, the attribute information items are categorized into plural attribute types, such as time, week, position, weather, and vehicle type, and the predetermined discretization rules are previously determined for the respective attribute types.

FIG. 2 schematically illustrates an example of how each attribute data collector 12 converts time data items included in the attribute information items, which are categorized as time, into discrete values in accordance with the discretization rule determined for the attribute type time.

Specifically, each attribute data collector 12 divides the time data items into plural time range groups, and allocates a predetermined discrete value to time data items included within each of the time range groups.

For example, each attribute data collector 12 allocates a discrete value of "0" to time data items included within the time range group from 0:00:00 to 0:59:59, and allocates a discrete value of "1" to time data items included within the time range group from 1:00:00 to 1:59:59.

Similarly, each attribute data collector 12 allocates a distinct value to time data items included within each of the other time range groups.

Note that each attribute data collector 12 can allocate a distinct value to time data items included within each of week range groups including Monday group, Tuesday group, . . . , and Sunday group.

For discretizing position data items included in the attribute information items, which are categorized as position, in accordance with the discretization rule determined for the attribute type position, each attribute data collector 12 divides, for example, the position data items into plural latitude and longitude grid sections, and allocates a predetermined discrete value to position data items included within each of the position range groups.

For discretizing weather data items included in the attribute information items, which are categorized as weather, in accordance with the discretization rule determined for the attribute type weather, each attribute data collector 12 divides, for example, the weather data items into plural weather condition groups including sunny, cloud, rain, and snow, and allocates a predetermined discrete value to weather data items included within each of the weather condition groups.

For discretizing vehicle type data items included in the attribute information items, which are categorized as vehicle type, in accordance with the discretization rule determined for the attribute type vehicle type, each attribute data collector 12 divides, for example, the vehicle type data items into plural vehicle type groups or displacement-volume groups, and allocates a predetermined discrete value to vehicle type data items included within each of the vehicle type groups and/or displacement-volume groups.

Then, each attribute data collector 12 combines at least some of the discrete values of at least some of the attribute types with each other to thereby generate a discrete vector as an attribute data item. For example, if the three attributes types of time, position, and weather are used, each attribute data collector 12 extracts discrete value 0 of one of the time data items, discrete value 0 of one of the position data items, and discrete value 1 of one of the weather data items, and combines the extracted discrete values with each other to generate a discrete vector (0, 0, 1) as an attribute data item.

After completion of generation of predetermined many discrete vectors, i.e. attribute vectors, each attribute data collector 12 combines each of the feature data items collected by the feature data obtainer 11 with a corresponding one of the attribute data items, and sends the generated feature data items each correlating with a corresponding one of the attribute data items to the server 200 using radio communications.

The server 200 is mainly comprised of a computer including a processor, i.e. CPU, 200a, a memory 200b comprised of, for example, a RAM and a ROM, an I/O interface 200c, and a radio communicator 200d; the ROM is an example of a non-transitory storage medium. The server 200 is for example installed in an information center. The CPU 200a of the server 200 runs one or more programs stored in the ROM of the memory 200b, thus implementing the functions of a distribution controller 20 and an assist provider 30. At least part or the whole of each of the functional modules 20 and 30 can be implemented as a hardware circuit or a hardware/software hybrid circuit.

The distribution controller 20 includes a feature storage unit 21 including a feature DB 21a, a distribution integrator 22, and an integration storage unit 23 including a distribution integration DB 23a; the feature DB 21a and the distribution integration DB 23a are provided in, for example, the memory 200b or in an external storage medium.

The feature storage unit 21 is configured to store the feature data items and the attribute data items in the feature DB 21a such that each of the feature data items correlates to a corresponding one of the attribute data items.

FIG. 3 schematically illustrates an example of a feature data set comprised of a feature data item and an attribute data item correlating thereto stored in the feature DB 21a. Specifically, the feature data set illustrated in FIG. 3 includes a feature ID, a feature data item, and an attribute data item. The feature ID assigned to each feature data set is a unique value uniquely identifying a pair of a feature data item and an attribute data item included in the corresponding feature data set.

If the three attribute types of time, position, and weather are used, an attribute data item is a vector of three discrete values. For example, as illustrated in FIG. 3, if the time data item of the attribute data item of the feature data set has a discrete value of 0, the position data item of the attribute data item of the feature data set has a discrete value of 0, and the weather data item of the attribute data item of the feature data set has a discrete value of 0, the attribute data item is expressed as (0, 0, 0).

Additionally, as described above, each feature data item according to the exemplary embodiment is comprised of plural discrete values respectively corresponding to plural driving information items or their processed data items as discrete elements of the corresponding feature data vector. For example, if each feature data item is comprised of four discrete values of 0.5, −3, 2.7, and 0.5, the corresponding feature data item is expressed as (0.5, −3, 2.7, and 0.5).

Specifically, the feature storage unit 21 is configured to store the feature data items and the attribute data items, which have been collected for a relatively long period, such as one week, in the feature DB 21a such that each of the feature data items correlates to a corresponding one of the attribute data items. In particular, the feature storage unit 21 is configured to store the feature data items and the attribute data items in the feature DB 21a collected by the vehicles V upon determining, based on the feature data items, that there are no abnormalities in the travelling situations of the vehicles V.

The distribution integrator 22 includes a distribution generator 220, a similarity calculator 221, a corrector 222, and an integrator 223.

The distribution generator 220 performs a feature distribution generating task.

That is, the feature distribution generating task cyclically extracts, from the feature DB 21, plural sets of feature data items each correlating with the same attribute data item, and assigns, to each of the plural sets of feature data items, a unique ID, referred to as a distribution ID, thus (1) Generating feature distributions each being comprised of a corresponding one of the plural sets of feature data items (2) Storing the feature distributions in the distribution integration DB 23a such that each of the feature distributions correlates to a corresponding one of the distribution IDs The distribution ID serves as, for example, a distribution information item.

Specifically, each feature distribution is comprised of the driving information items collected from one or more of the vehicles V that are travelling in the same travelling situations.

Additionally, the distribution integrator 22 is configured to perform a distribution integration task.

Specifically, the distribution integrator 22 determines whether the feature distributions respectively having different distribution IDs are similar to one another. Upon determining that selected feature distributions having different distribution IDs are similar to one another, the distribution integrator 22 integrates the selected feature distributions with one another to thereby generate an integrated feature distribution, and changes the different distribution IDs assigned to the selected feature distributions to a common distribution ID assigned to the integrated feature distribution.

FIG. 4A schematically illustrates a correlation between different distribution IDs and corresponding attribute data items stored in the distribution integration DB 23a, and FIG. 4B schematically illustrates a correlation between common distribution IDs and corresponding attribute data items stored in the distribution integration DB 23a.

Specifically, in FIG. 4A, feature data items to which the same attribute data item (0, 0, 0) is assigned constitute a feature distribution to which the common distribution ID 1 is assigned. Similarly, feature data items to which the same attribute data item (0, 0, 1) is assigned constitute a feature distribution to which the common distribution ID 2 is assigned. Additionally, feature data items to which the same attribute data item (0, 0, 2) is assigned constitute a feature distribution to which the common distribution ID 3 is assigned. That is, the different distribution IDs 1, 2, and 3 are assigned to the respective different feature distributions.

Here, let us assume that the distribution integrator 22 performs the distribution integration task for the feature distributions illustrated in FIG. 4A, so that it is determined that the feature distribution with the attribute data item (0, 0, 0) and the distribution ID 1 and the feature distribution with the attribute data item (0, 0, 1) and the distribution ID 2 are similar to each other.

In this assumption, this results in the feature distribution with the attribute data item (0, 0, 0) and the distribution ID 1 and the feature distribution with the attribute data item (0, 0, 1) and the distribution ID 2 being integrated with each other. As illustrated in FIG. 4B, the distribution integration task causes the distribution ID 2 of the feature distribution with the attribute data item (0, 0, 2) to be changed to the common distribution ID 1 that is assigned to the feature distribution with the attribute data item (0, 0, 0).

That is, the distribution integration task enables all the feature data items belonging to a common distribution ID to be managed as an integrated single feature distribution.

The assist provider 30 includes a recent feature storage unit 31, a recent feature DB 31a, a distribution comparator 32, and an assist providing unit 33.

The recent feature storage unit 31 is configured to obtain the feature data items collected from the feature data obtainer 11 and the attribute data items collected from the attribute data obtainer 12; these obtainers 11 and 12 are installed in each of the vehicles 10.

Then, the recent feature storage unit 31 is configured to store the feature data items and the attribute data items in the recent feature DB 31a such that each of the feature data items correlates to a corresponding one of the attribute data items.

Specifically, the recent feature storage unit 31 is configured to store the feature data items and the attribute data items, which have been collected for a relatively recent short period, such as ten minutes, in the recent feature DB 31a such that each of the feature data items correlates to a corresponding one of the attribute data items. In particular, the recent feature storage unit 31 is configured to store the feature data items and the attribute data items in the recent feature DB 31a collected by the vehicles V before execution of a determination of whether there is an abnormality in the current travelling situations of the vehicles V. That is, the feature data items and corresponding attribute data items stored in the recent feature DB 31a are used to determine whether there is an abnormality in the current travelling situations of the vehicles V.

The distribution comparator 32 extracts, from the recent feature DB 31, a set of feature data items each correlating with a specified attribute data item, and assigns, to the set of feature data items, a distribution ID, thus generating a target feature distribution being comprised of the set of feature data items correlating with the specified attribute data item.

In addition, the distribution comparator 32 extracts, from the distribution integration DB 23a, a set of feature data items each correlating with the specified attribute data item as a comparative feature distribution.

For example, in FIG. 4B, if the specified attribute data item is (0, 0, 0). the distribution comparator 32 extracts, from the distribution integration DB 23a, all feature distributions each correlating to the distribution ID corresponding to the attribute data item (0, 0, 0). That is, the distribution comparator 32 extracts, from the distribution integration DB 23a, the feature distribution with the attribute data item (0, 0, 0) and the feature distribution with the attribute data item (0, 0, 1).

Like the distribution integration task described later, the distribution comparator 32 calculates a maximum mean discrepancy (MMD) between the target feature distribution and the comparative feature distribution to thereby calculate a similarity level between the target feature distribution and the comparative feature distribution. How the distribution comparator 32 calculates the similarity level between the target feature distribution and the comparative feature distribution will be described in detail in the description of the distribution integration task.

The assist providing unit 33 determines whether the calculated similarity level calculated by the distribution comparator 32 is equal to or lower than a predetermined threshold. Upon determining that the calculated similarity level calculate by the distribution comparator 32 is equal to or lower than the predetermined threshold, the assist providing unit 33 determines that there is an abnormality in the travelling conditions represented by the specified attribute data item. Then, the assist providing unit 33 provides warning information to at least one of the vehicles V or other target vehicles to be assisted using the radio communications.

Specifically, upon determining that there is an abnormality in the travelling conditions represented by the specified attribute data item, the assist providing unit 33 provides warning information to at least one of the vehicles V or other target vehicles, which are predicted to travel in the same travelling conditions.

For example, if the specified attribute data item includes a discrete value indictive of the attribute type position, the assist providing unit 33 provides warning information to at least one of the vehicles V or other target vehicles, which are predicted to travel at the same position as the position represented by the discrete value within a predetermined period after the timing when it is determined that there is an abnormality.

As another example, if the specified attribute data item includes three discrete values indicative of the attribute types of time, position, and weather, the assist providing unit 33 provides warning information to at least one of the vehicles V or other target vehicles, which are predicted to travel on the same weather, same position, and same time represented by the respective three discrete values.

Distribution Integration Task

Figure 5:
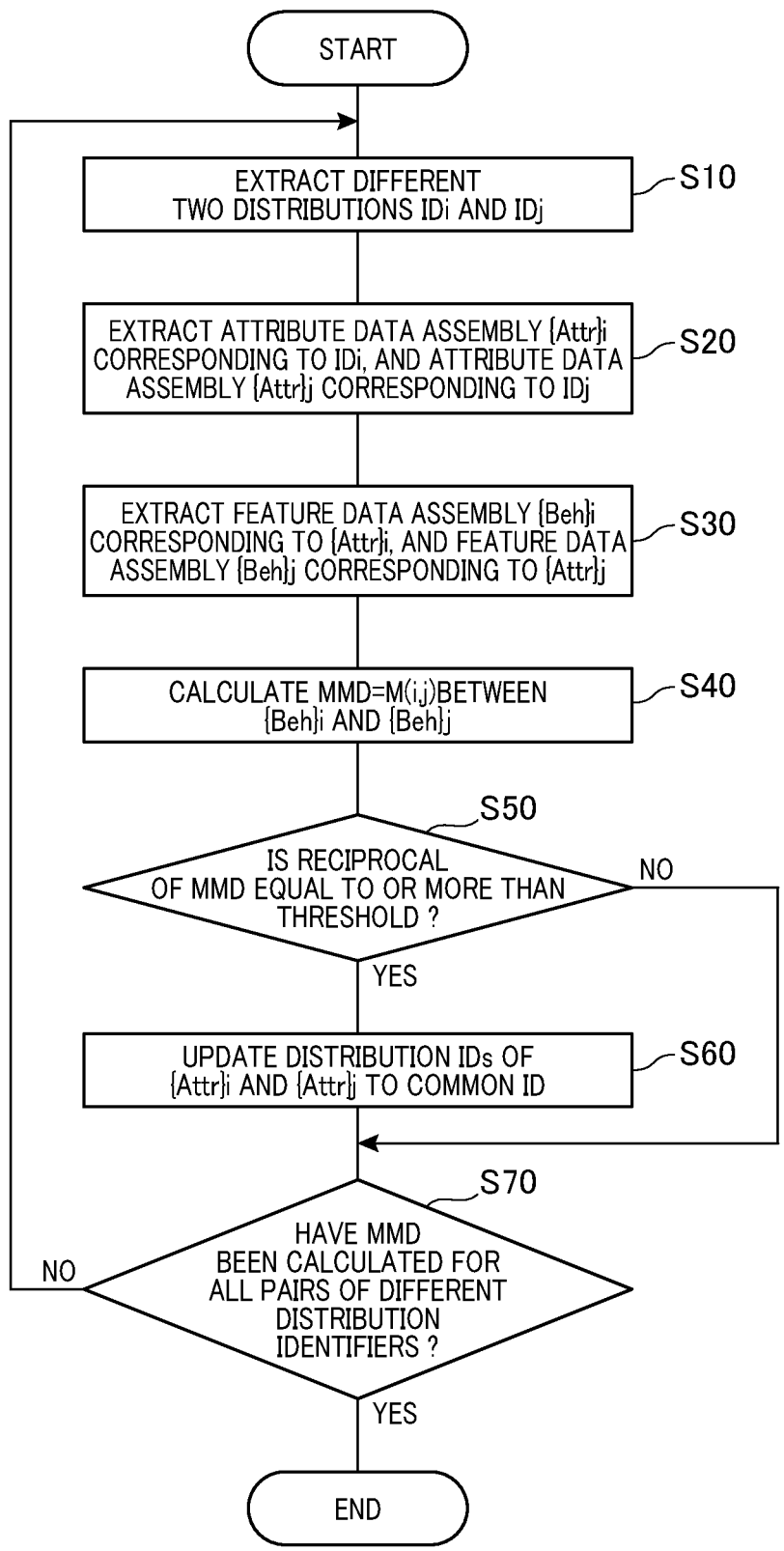
FIG. 5 is a flowchart schematically illustrating a distribution integration task to be carried out by a server illustrated in FIG. 1.

First, the following schematically describes, with reference to the flowchart of FIG. 5, the distribution integration task to be carried out by the CPU 200a, i.e. the distribution integrator 22. The CPU 200a, i.e. the distribution integrator 22, performs the distribution integration task each time the number of feature data items increases by a predetermined amount or every predetermined period. In order to clearly distinguish an abbreviated word ID from reference characters IDi and IDj, the following describes the abbreviated word ID as an identifier.

In step S10, the distribution integrator 22 extracts, from the distribution integration DB 23a, different distribution identifiers IDi and IDj where i and j are different natural numbers.

Next, the distribution integrator 22 extracts, from the distribution integration DB 23a, the assembly of attribute data items correlating to the distribution identifier IDi, which will be referred to as an assembly {Attr}i, and extracts, from the distribution integration DB 23a, the assembly {Attr}j of attribute data items correlating to the distribution identifier IDj in step S20.

As an example illustrated in FIG. 4B, if the distribution identifier IDi is set to 1 and the distribution identifier IDj is set to 3, the distribution integrator 22 extracts, from the distribution integration DB 23a, the assembly {Attr}i={(0, 0, 0) and (0, 0, 1)}, and the assembly {Attr}j={(0, 0,2)}.

Following the operation in step S20, the distribution integrator 22 extracts, from the distribution integration DB 23a, the assembly of feature data items corresponding to the assembly {Attr}i, which will be referred to as X={Beh}i, and extracts, from the distribution integration DB 23a, the assembly of feature data items corresponding to the assembly {Attr}j, which will be referred to as Y={Beh}j in step S30.

Next, the similarity calculator 221 calculates the similarity between the feature distribution I, which is a probability distribution of the assembly X={Beh}i of feature data items extracted in step S30, and the feature distribution J, which is a probability distribution of the assembly Y={Beh}j of feature data items extracted in step S30 in step S40.

Figure 6:
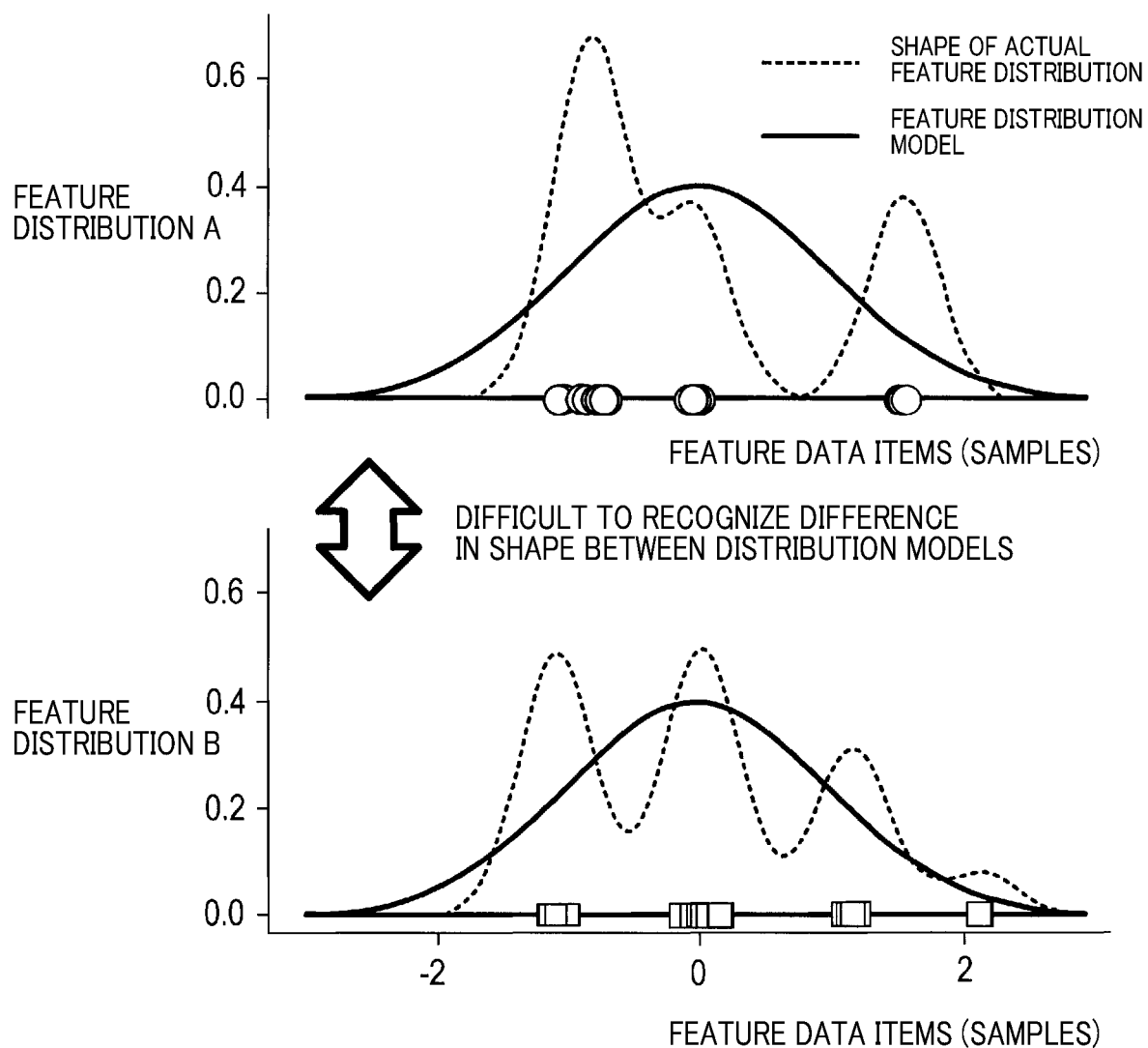
FIG. 6 is a graph schematically illustrating an example where complex feature distributions are each expressed by a simple statistical model, so that it is difficult to calculate a similarity level between the complex feature distributions.

Note that a probability distribution of plural feature data items may has a complicated shape. FIG. 6 schematically illustrates a feature distribution A, which is a probability distribution of feature data items and a feature distribution B, which is a probability distribution of feature data items (see dashed curves). In the feature distribution A, white transparent circles respectively represent feature data items, and in the feature distribution B, white transparent squares respectively represent feature data items.

As illustrated in FIG. 6, if each of the feature distributions A and B has a complicated shape, modelizing each of the feature distributions A and B as a simple statistical model (see solid curve) may cause little difference in shape between the feature distributions A and B, so that the feature distributions A and B are substantially similar to each other.

For this reason, if each of the feature distributions A and B is modeled based on a simple model, the similarity level between the feature distributions A and B may be calculated as a relatively high value although the similarity level between the shapes of actual feature distributions corresponding to the respective feature distributions A and B is a relatively low value.

Additionally, FIG. 7 schematically illustrates a feature distribution C, which is a probability distribution of feature data items and a feature distribution D, which is a probability distribution of feature data items (see dashed curves). In the feature distribution C, white transparent circles respectively represent feature data items, and in the feature distribution D, white transparent squares respectively represent feature data items.

As illustrated in FIG. 7, the feature data items are concentrated within each of neighbor ranges R1 and R2 in each of the feature distributions C and D. In particular, the neighbor range R1 of the feature distribution C has a higher distributed density than the neighbor range R2 thereof, but the neighbor range R2 of the feature distribution D has a higher distributed density than the neighbor range R1 thereof. For this reason, if the similarity level between the feature distributions C and D is designed to be calculated based on distances between feature data items, i.e. feature data samples, of the feature distribution C and corresponding feature data items, i.e. feature data samples, of the feature distribution D, which are closer to the feature data samples of the feature distribution C, the similarity level between the feature distributions C and D may be calculated as a relatively high value although the similarity level between the shapes of actual feature distributions corresponding to the respective feature distributions C and D is a relatively low value.

In view of the above point, the similarity level calculator 221 calculates a maximum mean discrepancy (MMD) between the feature distributions I and J in step S40. Note that the MMD represents a distance measure indicative of the similarity level between the feature distributions I and J while regarding the shape and density of each of the feature distributions I and J. Because the MMD between the feature distributions I and J increases as the dissimilarity between the feature distributions I and J increases, the similarity level calculator 221 calculates the reciprocal of the MMD as the similarity level between the feature distributions I and J.

That is, the configuration of the similarity level calculator 221, which calculates the similarity level between the feature distributions I and J enables the similarity level between the feature distributions I and J to be evaluated while considering (1) The shape, for example, a complicated shape illustrated in FIG. 6, of each of the feature distributions I and J (2) The density difference between the feature distributions I and J Specifically, the similarity level calculator 221 calculates the MMD between the feature distributions I and J in accordance with the following equation (1):

$$MMD(X, Y) = \frac{1}{N_X^2}\sum_i\sum_j k(X_i, X_j) - \frac{2}{N_X N_Y}\sum_i\sum_j k(X_i, X_j) + \frac{1}{N_Y^2}\sum_i\sum_j k(X_i, X_j) \quad (1)$$

where:

(1) $X_i$ represents samples, i.e. feature data items, of the assembly X (2) $Y_i$ represents samples, i.e. feature data items, of the assembly Y (3) $N_X$ represents the number of samples of the assembly X (4) $N_Y$ represents the number of samples of the assembly Y (5) k represents a positive semidefinite kernel function Next, the similarity level calculator 221 calculates the reciprocal of the MMD between the feature distributions I and J as the similarity level between the feature distributions I and J in step S50. Then, the similarity level calculator 221 determines whether the similarity level, i.e. the reciprocal of the MMD, between the feature distributions I and J is equal to or more than a predetermined threshold in step S50.

In step S50, the corrector 222 can be configured to correct a calculation error included in the calculated similarity level between the feature distributions I and J; the calculation error depends on the number of samples, i.e. feature data items, belonging to each of the feature distributions I and J.

For example, it is assumed that that the similarity level between the feature distributions I and J is referred to as Sim(I,J), the number of samples of the feature distribution I is referred to as NI, and the number of samples of the feature distribution J is referred to as NJ. The similarity level calculator 221 can be configured to store, in the distribution integration DB23a, the similarity level Sim(I,J) between the feature distributions I and J such that the similarity level Sim(I,J) correlates to the number NI of samples of the feature distribution I and the number NJ of samples of the feature distribution I. That is, in the distribution integration DB 23a, many similarity levels each between a corresponding pair of feature distributions are each stored to correlate to the number of samples of one of the feature distributions and the number of samples of the other thereof.

When the similarity calculator 221 has calculated the similarity level Sim(P,Q) between the feature distribution P whose number of samples is referred to as PI and the feature distribution Q whose number of samples is referred to as QI, the corrector 222 is for example configured to (1) Extract, from the distribution integration DB 23a, other similarity levels each between a feature distribution whose number of samples is the same as the value PI and a feature distribution whose number of samples is the same as the value QI (2) Calculate the average similarity level of the extracted other similarity levels (3) Subtract, from the similarity level Sim(P,Q), the calculated average similarity level, thus calculating a corrected similarity level Sim(P,Q)

That is, the corrector 222 enables a calculation error due to sample-number bias included in the calculated similarity level between the feature distributions I and J to be eliminated from the calculated similarity level.

Note that the similarity level calculator 221 can use the corrected similarity level to determine whether the uncorrected similarity level between the feature distributions I and J is equal to or more than the predetermined threshold in step S50.

Upon determining that the similarity level, i.e. the reciprocal of the MMD, between the feature distributions I and J is equal to or more than the predetermined threshold (YES in step S50), the distribution integration task proceeds to step S60. Otherwise, upon determining that the feature distributions I and J is less than the predetermined threshold (NO in step S50), the distribution integration task proceeds to step S70.

In step S60, the integrator 223 updates the distribution identifier IDi of the assembly {Attr}i of attribute data items and the distribution identifier IDj of the assembly {Attr}i of attribute data items to a common distribution identifier, thus integrating the feature distributions I and J with each other. Specifically, the integrator 23 is configured to (1) Select one of the distribution identifier IDi of the assembly {Attr}i of attribute data items and the distribution identifier IDj of the assembly {Attr}i of attribute data items, which is lower than the other thereof (2) Update each of the distribution identifier IDi and the distribution identifier IDj to the smaller one of the distribution identifier IDi and the distribution identifier IDj as the common distribution identifier Following the operation in step S60, the integrator 223 determines whether the MMD has been calculated for all pairs of different distribution identifies stored in the distribution integration DB 23a in step S70. Upon determining that the MMD has not been calculated yet for all pairs of different distribution identifies stored in the distribution integration DB 23a (NO in step S70), the integrator 223 returns to step S10, and repeatedly carries out the operations in step S10 to S70 until the determination in step S70 is affirmative. Otherwise, upon determining that the MMD has been calculated for all pairs of different distribution identifies stored in the distribution integration DB 23a (YES in step S70), the integrator 223 terminates the distribution integration task.

Advantageous Effects

The exemplary embodiment described above achieves the following advantageous effects.

The server 200 is configured to calculate the similarity level between different two feature distributions based on the reciprocal of the MMD while regarding the shape and density of each of the different feature distributions, thus integrating the different two feature distributions into a common integrated feature distribution. This therefore enables the server 200, which serves as a feature data storage apparatus, to store feature distributions with higher accuracy.

The server 200 is additionally configured to correct calculation error included in the calculated similarity level between the different two feature distributions depending on the number of feature data items belonging to each of the different two feature distributions. This configuration results in a reduction of the adverse effects on the similarity level due to the calculation error, making it possible to improve the accuracy of the similarity level.

Modifications

The exemplary embodiment of the present disclosure have been described, but the present disclosure is not limited to the above exemplary embodiment, and can be variably modified.

Each of the collection units 10 installed in a corresponding vehicle V is comprised of the feature data obtainers 11, the attribute data obtainer 12, and the attribute DB 13, but the present disclosure is not limited thereto. Specifically, each of the collection units 13 can be simply configured to send the vehicle information items to the server 200, and the server 200 can be comprised of the feature data obtainers 11, the attribute data obtainer 12, and the attribute DB 13.

The functions of one element in the exemplary embodiment can be distributed as plural elements, and the functions that plural elements have can be combined into one element. At least part of the structure of the exemplary embodiment can be replaced with a known structure having the same function as the at least part of the structure of the exemplary embodiment. A part of the structure of exemplary embodiment can be eliminated. All aspects included in the technological ideas specified by the language employed by the claims constitute embodiments of the present disclosure.

The present disclosure can be implemented by various embodiments in addition to the feature data storage apparatus; the various embodiments include systems each including the feature data storage apparatus, programs for serving a computer as the feature data storage apparatus, storage media, such as non-transitory storage media storing the programs, and methods of generating a feature data storage apparatus.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A feature data storage apparatus for storing distributions of feature data items that are based on driving information items collected from a plurality of vehicles, the feature data storage apparatus comprising:
    a feature database configured to store the feature data items and attribute data items such that each of the feature data items correlates to at least one of the attribute data items, each of the attribute data items representing an attribute of at least one of the feature data items;
    a distribution database configured to store distribution information items respectively representing feature distributions, each of the feature distributions including a set of selected feature data items in the feature data items stored in the feature database, the set of the selected feature data items correlating to a common one of the attribute data items, each of the distribution information items being stored to correlate to the common one of the attribute data items, the distribution information items including a first distribution information item and a second distribution information item, the first distribution information item being stored to correlate to a first common one of the attribute data items, the second distribution information item being stored to correlate to a second common one of the attribute data items, the first common one of the attribute data items being different from the second common one of the attribute data items, the second distribution information item being different from the first distribution information item; and
    a computer configured to:
        calculate, in accordance with a maximum mean discrepancy, a similarity level between:
            a target feature distribution represented by the first distribution information item stored in the distribution database; and
            a comparative feature distribution represented by the second distribution information item stored in the distribution database, the maximum mean discrepancy being a distance measure indicative of the similarity level between the target and comparative feature distributions;
        determine whether the calculated similarity level is equal to or higher than a predetermined threshold; and
        integrate the target feature distribution and the comparative feature distribution into a common feature distribution upon determining that the calculated similarity level is equal to or higher than the predetermined threshold.

2. The feature data storage apparatus according to claim 1, further comprising:
    a corrector configured to correct a calculation error included in the calculated similarity level, the calculation error depending on the number of each of a first feature data item and second feature data item.

3. The feature data storage apparatus according to claim 1, wherein:
    the computer is configured to update the first distribution information item for the target feature distribution and the second distribution information item for the comparative feature distribution to a common distribution information item, thus integrating the target feature distribution and the comparative feature distribution into the common feature distribution.

4. The feature data storage apparatus according to claim 1, wherein:
    the computer is configured to calculate a reciprocal of the maximum mean discrepancy as the similarity level between the target and comparative feature distributions.

5. A method of storing distributions of feature data items that are based on driving information items collected from a plurality of vehicles, the method comprising:
    storing, in a feature database, the feature data items and attribute data items such that each of the feature data items correlates to at least one of the attribute data items, each of the attribute data items representing an attribute of at least one of the feature data items;
    storing, in a distribution database, distribution information items respectively representing feature distributions, each of the feature distributions including a set of selected feature data items in the feature data items stored in the feature database, the set of the selected feature data items correlating to a common one of the attribute data items, each of the distribution information items being stored to correlate to the common one of the attribute data items, the distribution information items including a first distribution information item and a second distribution information item, the first distribution information item being stored to correlate to a first common one of the attribute data items, the second distribution information item being stored to correlate to a second common one of the attribute data items, the first common one of the attribute data items being different from the second common one of the attribute data items, the second distribution information item being different from the first distribution information item;
    calculating, in accordance with a maximum mean discrepancy, a similarity level between:
        a target feature distribution represented by the first distribution information item stored in the distribution database; and
        a comparative feature distribution represented by the second distribution information item stored in the distribution database, the maximum mean discrepancy being a distance measure indicative of the similarity level between the target and comparative feature distributions;

determining whether the calculated similarity level is equal to or higher than a predetermined threshold; and integrating the target feature distribution and the comparative feature distribution into a common feature distribution upon determining that the calculated similarity level is equal to or higher than the predetermined threshold.

* * * * *